BEST AVAILABLE COPY

No. 12,431. REISSUED JAN. 2, 1906.

A. L. CUSHMAN.

INDUCTION MOTOR.

APPLICATION FILED NOV. 19, 1904.

Witnesses:
Joseph T. Brennan
Mary M. Danicher.

Inventor:
Abe L. Cushman,
by Roberts & Mitchell
Attorneys.

BEST AVAILABLE COPY

UNITED STATES PATENT OFFICE.

ABE LINCOLN CUSHMAN, OF CONCORD, NEW HAMPSHIRE, ASSIGNOR, BY DIRECT AND MESNE ASSIGNMENTS, TO THE CUSHMAN ELECTRIC COMPANY, OF CONCORD, NEW HAMPSHIRE, A CORPORATION OF MAINE.

INDUCTION-MOTOR.

No. 12,431. Specification of Reissued Letters Patent. Reissued Jan. 2, 1906.

Original No. 725,224, dated April 14, 1903. Application for reissue filed November 19, 1904. Serial No. 233,541.

*To all whom it may concern:*

Be it known that I, ABE LINCOLN CUSHMAN, a citizen of the United States, residing at Concord, county of Merrimack, State of New Hampshire, have invented certain new and useful Improvements in Induction-Motors, of which the following is a full, clear, and exact description.

My invention relates to induction-motors, and has for its object to secure a good starting torque without the insertion or use of any high specific resistance material in the secondary or induced circuit. I accomplish this end by dividing the winding into a plurality of elements, all of low specific resistance material, such as copper, which may be entirely separate or may be connected star or delta fashion or otherwise, so long as they can be brought into action gradually or successively. When in star connection, as shown in the accompanying drawings, they are connected into a plurality of star-connected multiple-arc closed circuits when at speed, while when starting there is but a single star-connected winding. This results in a reduction of the current in the induced element at starting and prevents such retardation or lag in the induced current as would prevent a starting torque.

Referring to the drawings, Figure 1 represents a star-winding for an eight-pole induction-motor embodying my invention. Fig. 2 represents diagrammatically the star-winding of Fig. 1. Fig. 3 represents a convenient form of switch or controller for bringing the elements into action.

In the drawings, A is a core having slots 1 to 24 for the induced winding. In each slot are three bars B C D of material of low specific resistance, such as copper, those in every third slot being connected, as shown, so as to form three sets of conductors or elements, those bars in the same slot belonging to the same set. One end of each of the three conductors or elements of each set is connected to a conductor E, while the other ends are connected to contacts F′ G′ H′, $F^2$ $G^2$ $H^2$, and $F^3$ $G^3$ $H^3$, respectively.

I is a switch-block consisting of three blocks $i'$, $i^2$, and $i^3$, electrically connected and adapted to be moved so as to make contact successively with the terminals F′ G′ H′, &c. The switch-block I always makes contact with the blocks F′ $F^2$ $F^3$ and as it is moved makes contact with the contacts G′ $G^2$ $G^3$ and then also with H′ $H^2$ $H^3$. In this way at starting only one conductor or element of each set is in circuit, while when speed is gained a second conductor of each set is put in circuit and when full speed is reached all three conductors of each set are put in circuit. The ring E and the block I make the two joints of a closed circulated star-winding which is made up of single or multiple windings, according to the position of the block I.

Figure 1:
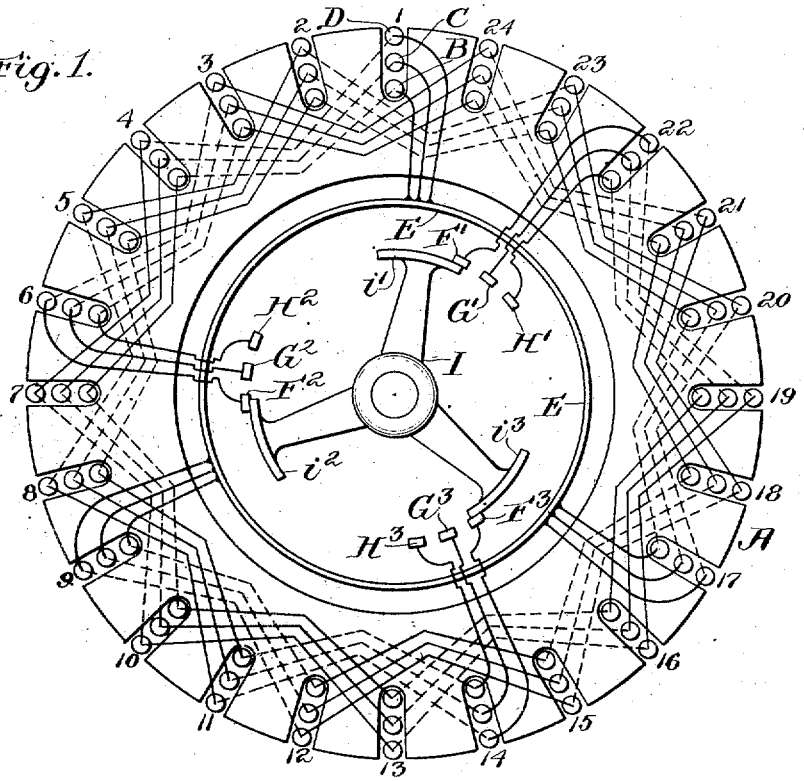
Figure 2:
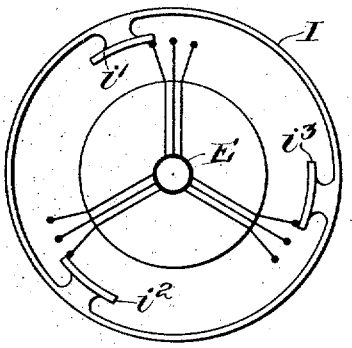
Fig. 2 represents in a simplified diagram the connections of a star-winding for any number of poles, I being the block for connecting the sections successively.
Figure 3:
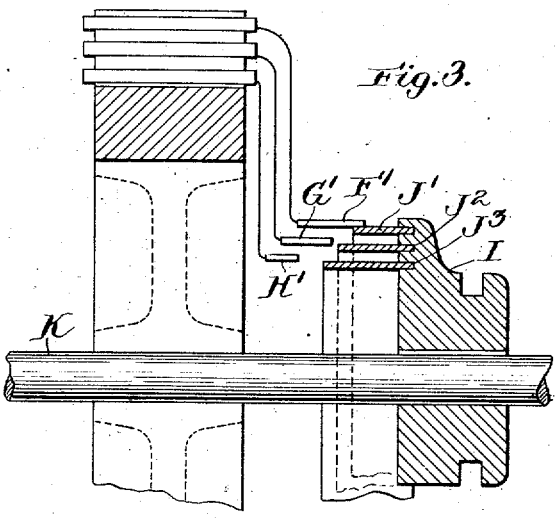
Fig. 3 represents the terminals F′ G′ H′ and the preferred form of the block I. As there shown, it consists of three conducting-rings $j'$ $j^2$ $j^3$, surrounding the shaft K, which rings as the block is moved along the shaft K make contact successively with the terminals F′ G′ H′ and also with the free terminals of the other conductors arranged in similar manner.

It will be seen from the above that only material of low specific resistance need be used, and yet the current in the induced portion is kept small at starting without the introduction of any material of high specific resistance, and the starting torque is made correspondingly large, while when speed has been acquired the introduction of the other conductors increases the energy in the induced secondary current and increases the power of the motor.

What I claim is—

1. In an induction-motor, a secondary member provided with a secondary winding having a plurality of elements arranged in multiple arc, all adapted to carry currents in one direction only, any desired number of which may be used at the same time, and each of which when in use acts as an effective element of the winding contributing to the polarization of the secondary member, and means carried by the secondary member for bringing said elements one at a time into action and for removing them from action, said means admitting the current fully to each element as such element is brought into action.

2. In an induction-motor, the combination of a secondary winding made up of elements of low specific resistance, and means for form-

BEST AVAILABLE COPY ing a closed induced circuit from a part only of said elements so as to reduce the current induced in said secondary at starting, and means for bringing into action additional elements as the motor speeds up.

3. In an induction-motor, the combination of a secondary winding made up of elements of low specific resistance, means for forming a closed circuit from part of said elements, and means for forming additional closed circuits from other elements as the motor speeds up.

4. In an induction-motor, the combination of a secondary winding made up of elements of low specific resistance, means for forming a closed circuit from a part of said elements and means for forming additional closed circuits in multiple arc therewith from other elements as the motor speeds up.

5. In an induction-motor, the combination of a plurality of elements part of which form star-connected closed circuits and means for connecting others of said elements to form additional star-connected closed circuits and disconnecting them as desired.

6. In an induction-motor, the combination of a plurality of elements part of which are connected in closed circuit star fashion and means for connecting others of said elements in closed circuits star fashion and in multiple arc with said first star-connected elements.

7. In an induction-motor, the combination of a winding made up of a plurality of elements of low specific resistance, a switch for gradually bringing said elements into and removing them from action, and means for operating said switch.

Signed at Concord, New Hampshire, this 12th day of November, 1904.

ABE LINCOLN CUSHMAN.

Witnesses:

D. M. Monjo,

L. W. Durgin.